United States Patent [19]

Connors et al.

[11] 4,152,764
[45] May 1, 1979

[54] FLOATING-PRIORITY STORAGE CONTROL FOR PROCESSORS IN A MULTI-PROCESSOR SYSTEM

[75] Inventors: William D. Connors, Poughkeepsie; Dale M. Junod, Highland, both of N.Y.

[73] Assignee: International Business Machines Corporation, Armonk, N.Y.

[21] Appl. No.: 778,290

[22] Filed: Mar. 16, 1977

[51] Int. Cl.² .................. G06F 9/18; G06F 15/16
[52] U.S. Cl. ................................................ 364/200
[58] Field of Search ...... 364/200 M.S. File, 900 M.S. File

[56] References Cited

U.S. PATENT DOCUMENTS

| | | | |
|---|---|---|---|
| 3,528,061 | 9/1970 | Zurcher, Jr. | 364/200 |
| 3,566,357 | 2/1971 | Ling | 364/200 |
| 3,573,736 | 4/1971 | Schlaeppi | 364/200 |
| 3,603,935 | 9/1971 | Moore | 364/200 |
| 3,715,729 | 2/1973 | Mercy | 364/200 |
| 3,921,145 | 11/1975 | Emm et al. | 364/200 |

*Primary Examiner*—Mark E. Nusbaum
*Assistant Examiner*—Michael C. Sachs
*Attorney, Agent, or Firm*—Bernard M. Goldman

[57] ABSTRACT

The disclosure describes a floating-priority storage access control arrangement for plural processors to a shared main storage in a multi-processing (MP) system. The shared main storage logically couples the main storage units provided with each of the processors into a single expanse of real addresses available to each processor. Exclusive access to the shared storage is given to any processor for as long as that processor can provide a burst of one or more successive storage requests. The burst ends when that processor misses a storage cycle by not providing a locally granted request.

The shared storage access is controlled in each processor by means of an MP priority pointer circuit which receives storage requests granted by a local priority circuit in the processor. The MP priority pointer circuits are interconnected between the processors. When a burst ends for one processor, another processor having one or more pending storage requests is given priority and begins its burst during the missed cycle, continuing with highest priority until it completes its burst by not having a locally granted request during a cycle. If no processor makes a request during a storage cycle, and both processors simultaneously make a request during a following cycle, priority for an access burst is given to the processor which last had priority. Thus, priority flip-flops back and forth between the processors as they respectively access main storage in bursts of requests.

6 Claims, 6 Drawing Figures

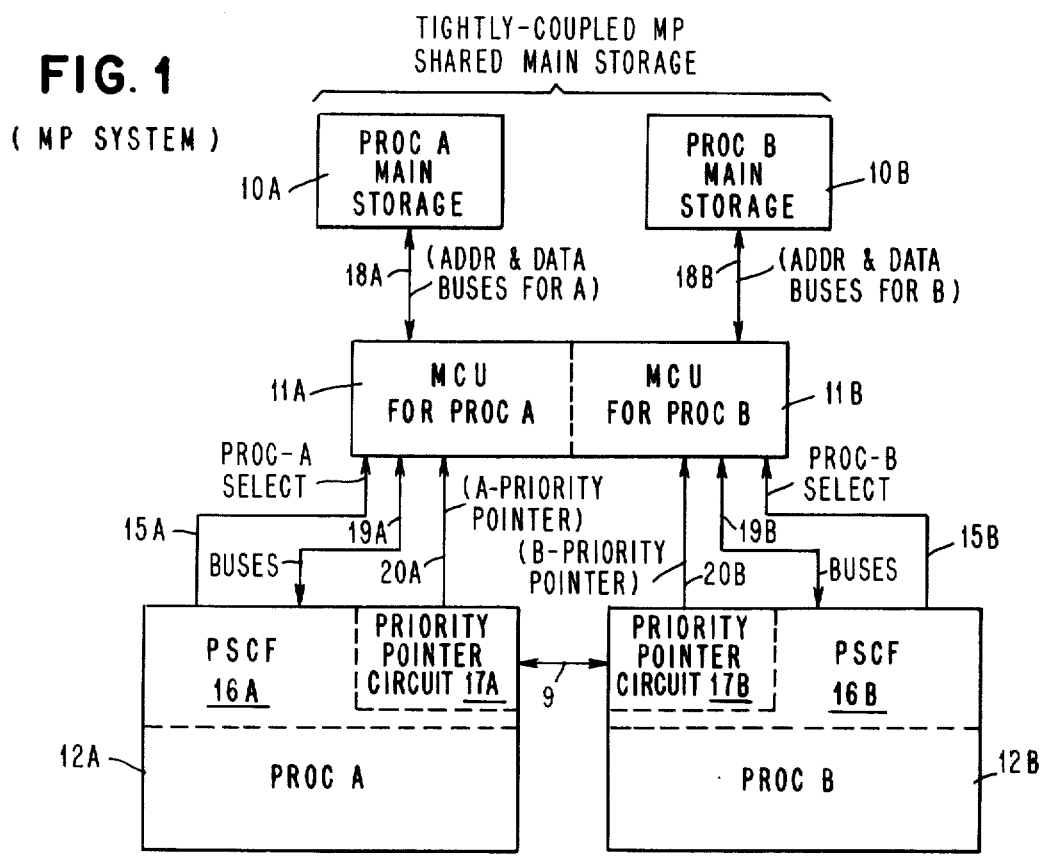
FIG. 1 (MP SYSTEM)
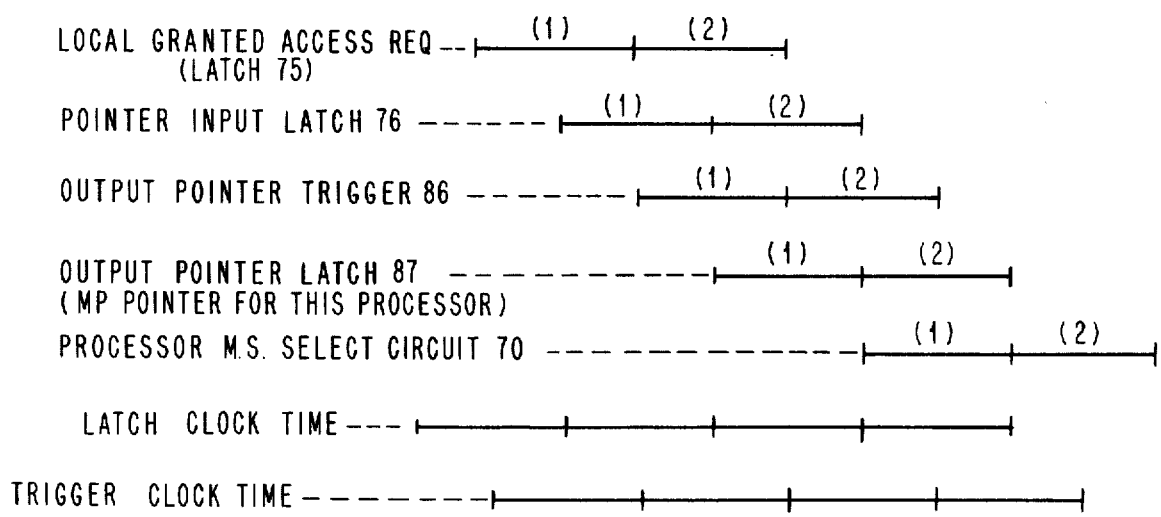
FIG. 5 (TIMING FOR EITHER PROCESSOR GIVEN PRIORITY)

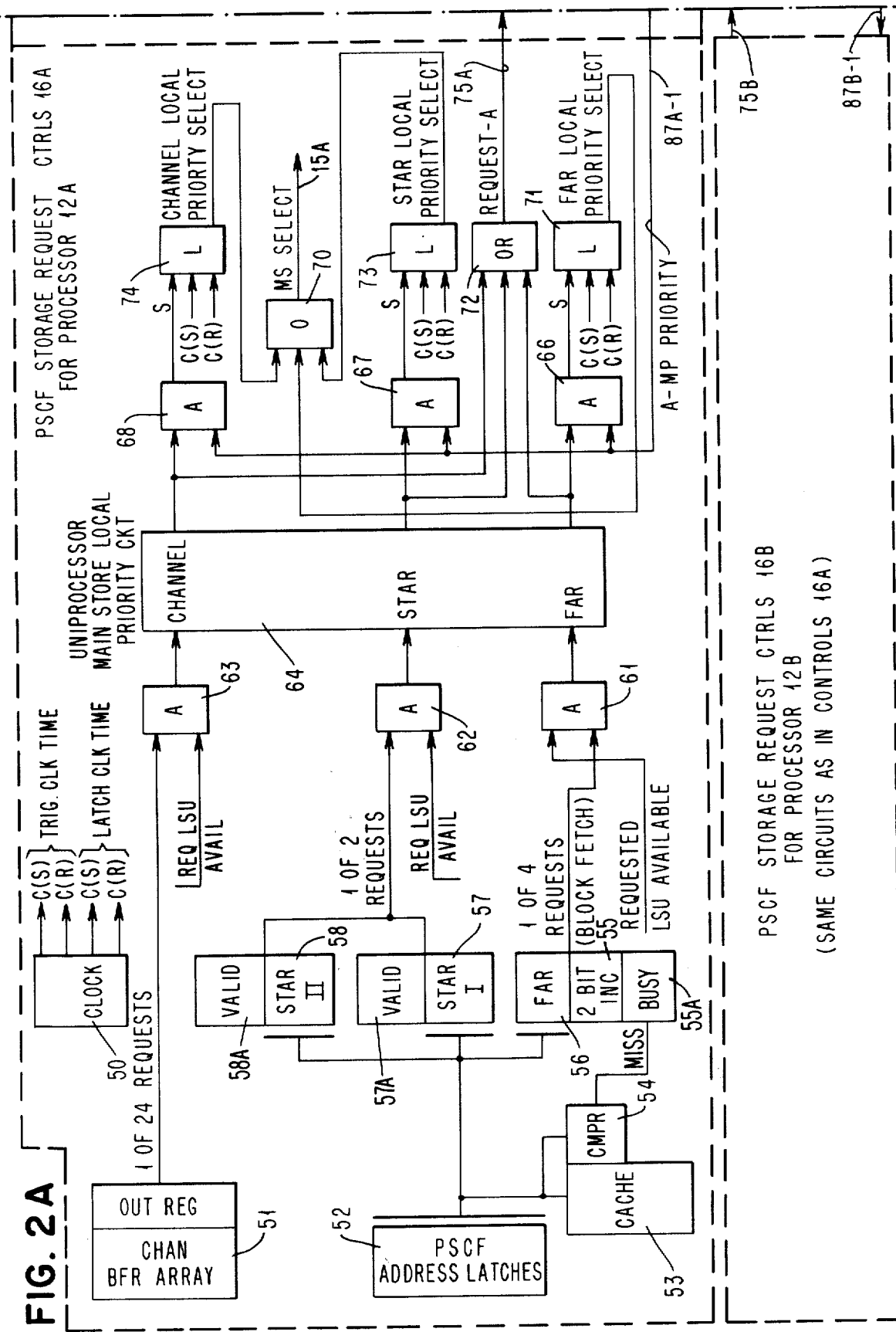

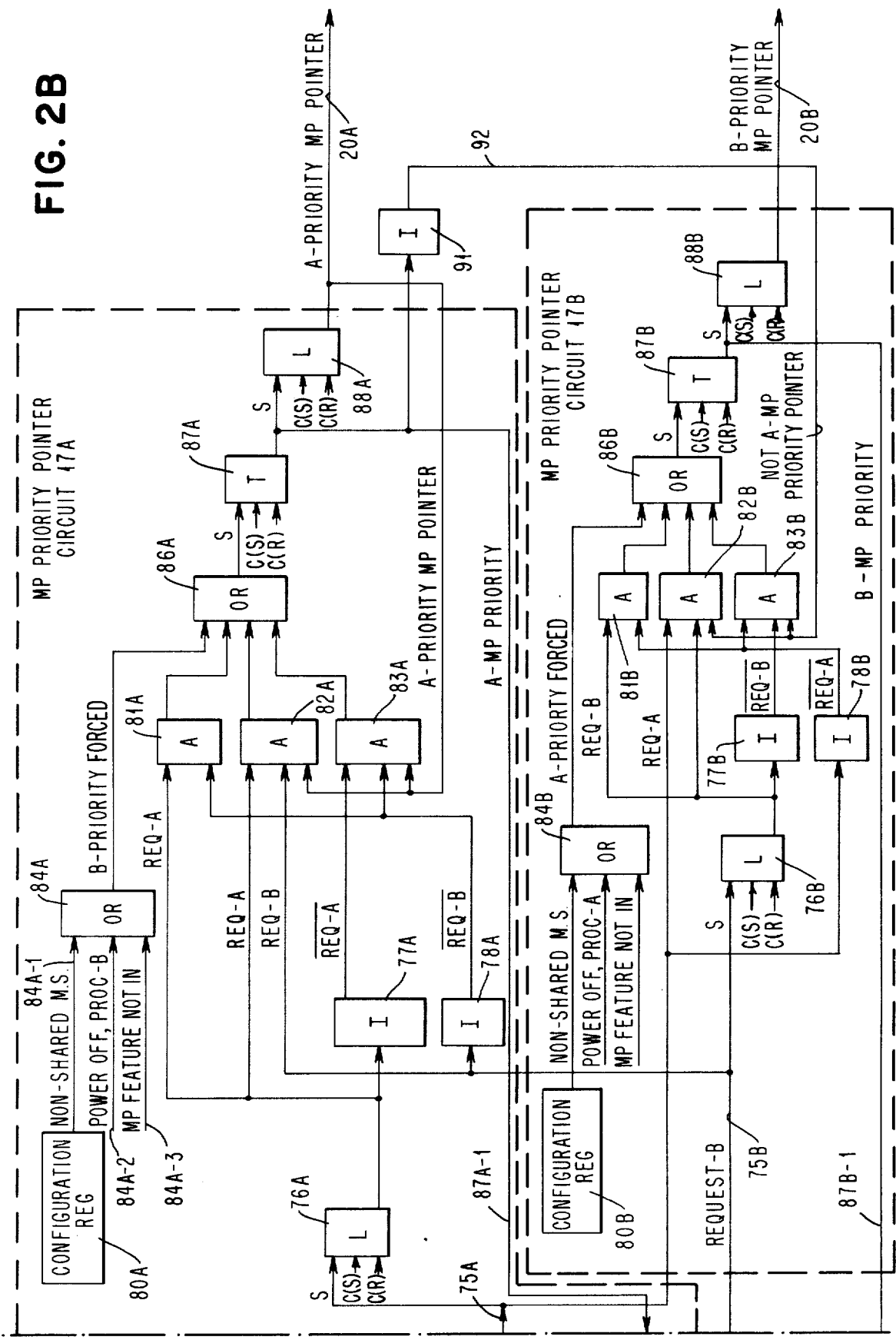

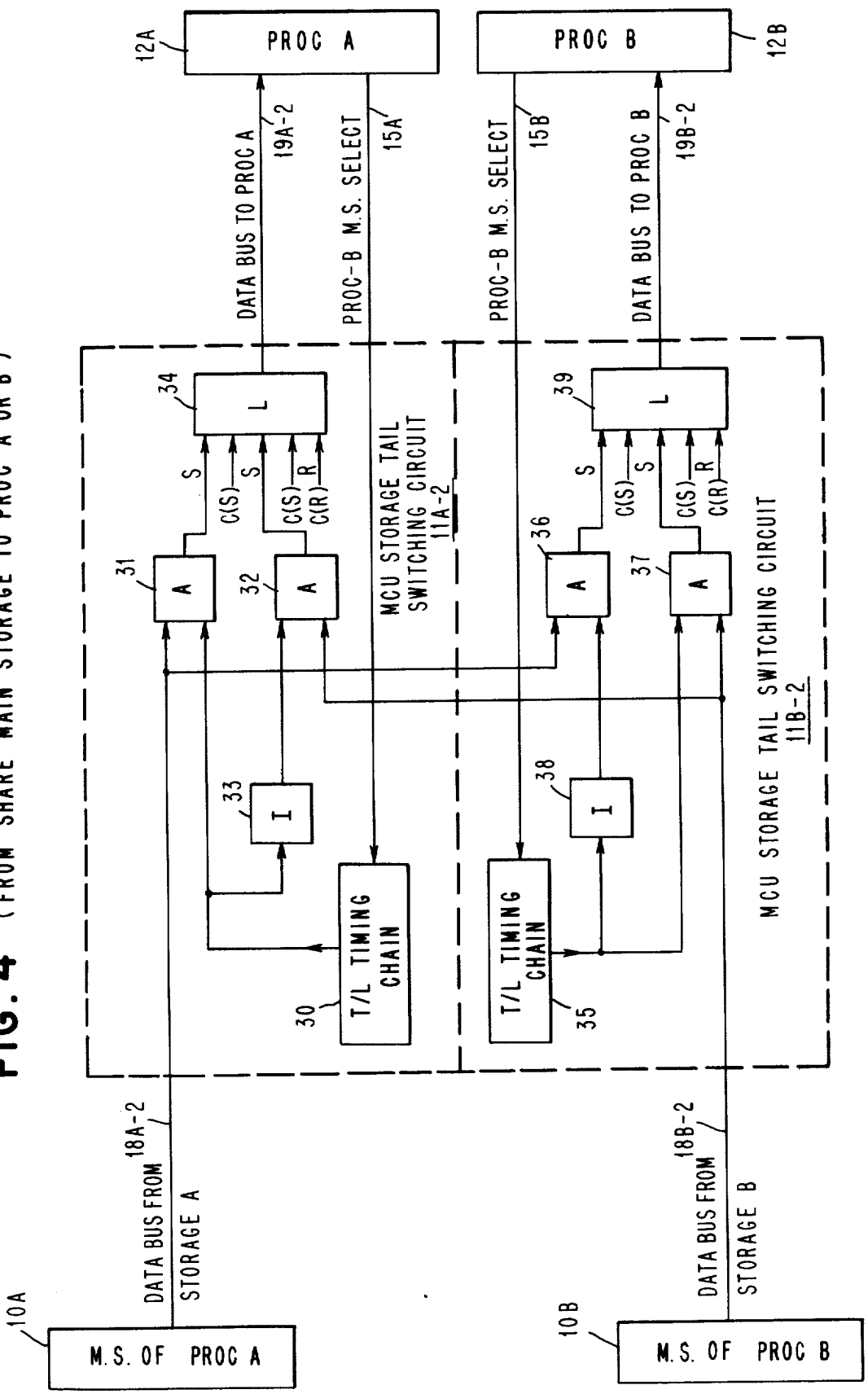
FIG. 4 (FROM SHARE MAIN STORAGE TO PROC A OR B)

FLOATING-PRIORITY STORAGE CONTROL FOR PROCESSORS IN A MULTI-PROCESSOR SYSTEM

INTRODUCTION

This invention relates to a circuit arrangement for controlling main storage accesses by each of plural processors in a multi-processing system having tightly-coupled main storage units providing a single main storage entity. The processors operate independently of each other while sharing the use of the single main storage entity.

PRIOR ART

There is much prior art in the area of priority determination for storage access within a processor, and among plural processors in multiprocessor systems. Several conventional solutions are available for resolving simultaneous storage contention by plural processors in a multi-processing system. One solution assigned predetermined priorities among plural processors, so that when simultaneous contention occurred, the highest priority processor was given access first. This is a type of static priority, because it does not change. Another solution was to provide alternating access availability between plural processors in a multi-processing system, wherein each processor was assigned a particular phase in the alternating cycles of a clock for access. The alternating priority may be forced such as in the IBM 168 multiprocessor, wherein if a processor had no request during its alternating cycle, the cycle was not used by any processor. Alternating priority may also operate on a select basis, such as in U.S. Pat. No. 3,445,819. This is another form of alternating priority.

SUMMARY OF THE INVENTION

The subject invention provides a novel contention resolving circuit arrangement for plural processors in a multi-processing system. The subject invention does not provide the prior art static priority bias in favor of a particular processor in a multi-processing arrangement. Instead, the invention provides a dynamic type of priority control which at different times shifts priority from one processor to another processor without any predetermined order among the processors.

The subject invention provides a multi-processor environment in which each processor accesses storage in a burst of storage requests. A burst lasts as long as a processor can locally grant a storage request for each next storage cycle. The burst ends whenever a storage cycle occurs without a granted storage request. A burst can consist of from one to several dozen storage requests. During a burst, shared main storage is being accessed by a processor as fast as the storage bandwidth permits, and no interference is permitted by any other processor. Upon completion of a burst, another processor having an available storage request is given priority during the next cycle after the burst so that no storage cycle is lost in the switch-over; and that processor continues with highest priority until it completes its burst by missing a cycle, due to not having a granted request during a cycle. If no processor makes a request during a storage cycle, and both processors simultaneously make a request during a next cycle, priority is given to the processor which last had priority for another burst. Thus priority flip-flops back and forth between the processors as they respectively access main storage in bursts of requests.

The invention improves the efficiency of multi-processor operation by eliminating unused storage cycles while requests exist. Prior multi-processing priority controls have lower efficiency because generally they leave some storage cycles unused due to the way they give priority to the different processors. For example, some prior circuits used storage cycles for priority determination, which were unused for storage accessing, or gave access cycles to particular processors in a repetitive sequence in which cycles were unused when a respective processor did not then have a storage request available.

The invention obtains maximum efficiency for a multi-processing system when the sum of the storage access rates for each of the processors in the system totals approximately 100% of the storage access cycle rate of the main storage. When the processors are identical models, the optimum storage access rate for each processor is approximately 100/N percent, in which N is the number of processors in the multi-processing system. Of course, even for identical processor models, the processor storage access rate will vary with different programmed jobs. It has been found in a multi-processor having two large processors that each processor's internal rate is 12 to 15% and its channel rate averages about 2% to provide a single processor rate which is about 14 to 17% of the maximum main storage rate.

It is therefore the primary object of this invention to provide a floating-priority storage access control arrangement for plural processors in a multi-processing system, in which access to a single shared main memory for the system is dynamically switched among the plural processors in bursts of successively granted storage requests from the processors.

It is another object of this invention to provide a floating-priority storage control arrangement among plural processors in a multi-processing system that provides higher overall multi-processing system performance efficiency than any prior known storage priority control arrangement for high-rate processors in a multi-processing system having a high-rate main storage system.

It is a further object of this invention to provide a storage access contention arrangement in a multi-processing system which distributes priority among processors on demand without bias toward any processor.

It is another object of this invention to maintain highest priority for any processor in a multi-processing system which is currently accessing main storage, without interference from any other processor in the system.

It is still another object of this invention to provide a floating-priority control arrangement for a multi-processing system that matches the maximum storage access rates of the processors to the maximum storage access rate of a tightly-coupled main storage arrangement.

It is a still further object of this invention to provide a floating-priority storage control circuit arrangement which is particularly adaptable to very high performance multi-processors having hierarchical storage systems.

It is another object of this invention to provide a pointer priority circuit in each processor in a multi-processing system having identical components in each processor, so that the circuit can be manufactured as as part of each processor, whether or not the processor is to operate as part of a multi-processing system, or as a uni-processor, so that the processor can at any later time easily be connected into a multi-processor system in which the other processors each have a pointer priority circuit.

It is still another object of this invention to provide highest priority to the last processor having highest priority in the case when no processor has requests for one or more storage cycles followed by a cycle in which more than one processor simultaneously have storage requests.

Other objects, features and advantages of the present invention will become more apparent in the light of the following detailed description of a preferred embodiment thereof, as illustrated in the drawings.

BRIEF DESCRIPTION OF THE DRAWINGS

FIG. 1 illustrates a block diagram of a multi-processing system having two processors with a preferred embodiment of the invention.

FIG. 2A represents pertinent parts of a processor storage control functions (PSCF) in each processor, which is used with the preferred embodiment of the invention.

FIG. 2B illustrates two priority pointer circuits and their interconnections in the preferred embodiment of the subject invention.

FIGS. 3 and 4 illustrate storage tail switching circuits in two multi-system communications units (MCUs) which control data transfers between either of two processors and the shared main storage comprised of the tight coupling of the main storage units of each processor in the multi-processing system embodiment.

FIG. 5 illustrates timing diagrams showing examples of timing found in the preferred embodiment.

Figure 3:
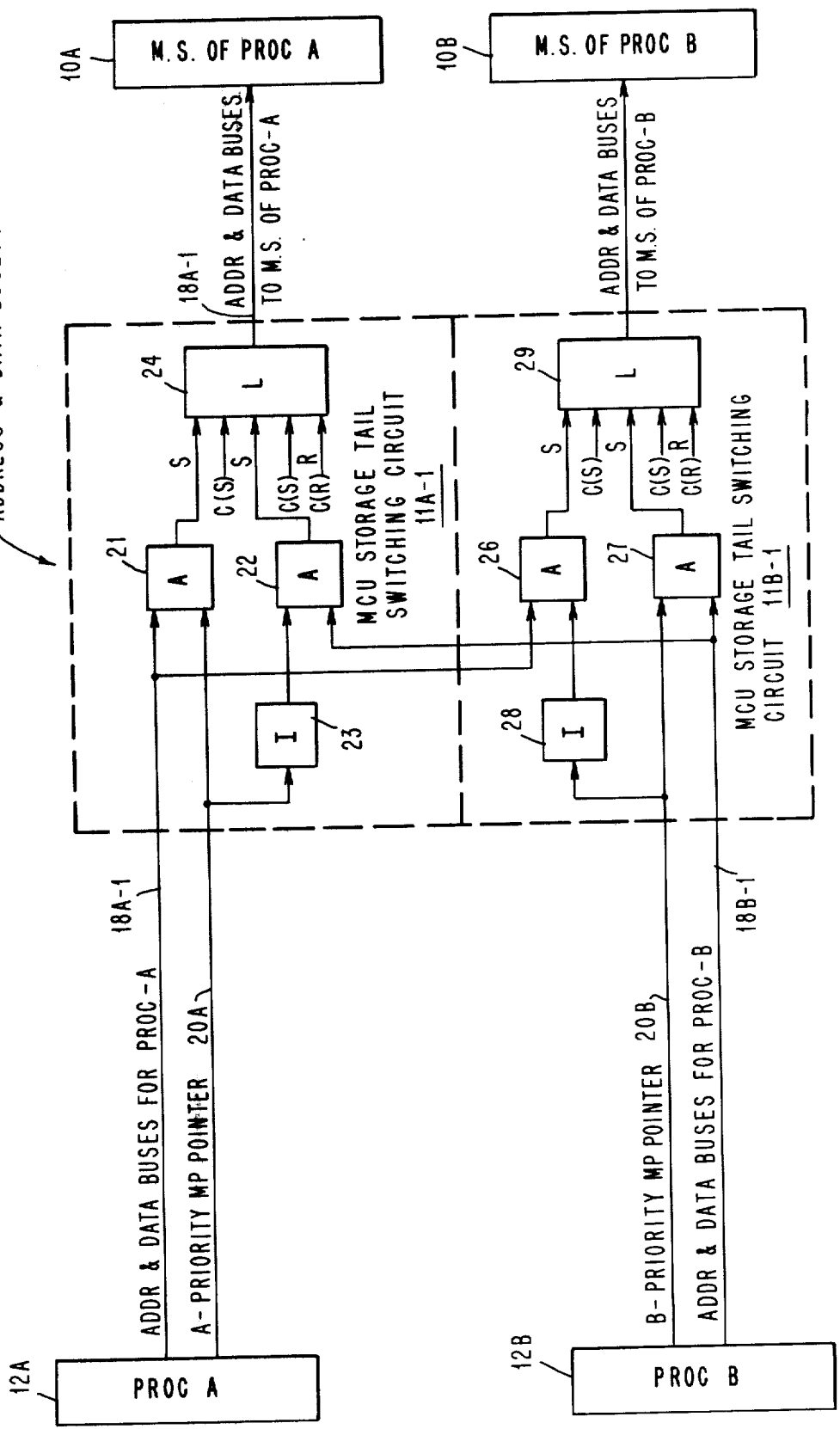

The multi-processor system in FIG. 1 is arranged with two storage units 10A and 10B (which are separate storage units physically provided with their respective processors 12A and 12B). Storage units 10A and 10B are operated by this invention as a single tightly-coupled multi-processor shared main storage entity, which has an addressable size equal to the sum of their separate address ranges. For example, the lower addresses in the tightly-coupled memory system may be provided in the memory unit 10A of processor 12A; while the higher addresses in the tightly-coupled system may be provided in the memory unit 10B of processor 12B, of vice versa. Alternatively, the unique addresses may be configured among the logical storage units (LSUs) in the two storage units 10A and 10B in any available order.

FIG. 1 is a block diagram of a multi-processing system having two processors 12A and 12B. The processors are respectively connected to main storage units 10A and 10B through respective multi-system communication units (MCUs) 11A and 11B. Address and data busses 19A and 19B respectively connect from the processor storage control functions (PSFs) 16A and 16B in the processors 12A and 12B to the respective MCUs 11A and 11B. Then the address and data bus paths are completed from the MUCs 11A and 11B to the respective main storage units 10A and 10B through address and data busses 18A and 18B respectively. Priority pointer circuits 17A and 17B are respectively provided in the processors. Lines 9 interconnect circuits 17A and 17B. Priority pointer output lines 20A and 20B connect the respective priority pointer circuits to the MCUs 11A and 11B to switch the data transfers on the address and data busses from a selected processor to the shared storage system. Also, outputs of pointer circuits 17A and 17B respectively gate select circuits in the PSCFs 16A and 16B which respectively control signals on processor select lines 15A and 15B which switch the data transfers from the shared storage system to a selected processor 12A or 12B on the respective address and data busses.

FIG. 2A illustrates in detail the storage request and select controls of PSCF unit 16A in processor 12A.

The PSCF controls in FIG. 2A contain conventional uni-processor storage request generation, buffering and priority resolving circuits which are local within a single processor, and which may be identical to the corresponding circuits in the publically used IBM S/370 M168 CPU. These circuits include a local priority circuit 64 which resolves all priority requests within the processor, so that it outputs only a single access request to storage at any given time on a line 75A for processor 12A. Corresponding local PSCF controls 16B in processor 12B outputs its single requests on line 75B in parallel with line 75A.

Thus, the tightly coupled arrangement permits each processor to have access to a much larger physical storage system than it otherwise would have if its accesses were restricted only to its own main storage unit. Therefore, each processor 12A or 12B has access to physical addresses in both main storage units 10A and 10B which eliminates the need for the duplication of system control programs and data in both units 10A and 10B. Also, each processor has the dual availability of both main storage units 10A and 10B if either should fail.

When the storage units 10A and 10B are tightly coupled into a single main storage, it is no longer possible for both processors to make simultaneous storage accesses into their respective storage units 10A and 10B. However, the multi-processor priority arrangement of this invention can maintain the serialized accesses for both processors approximately equal to the sum of the separate access rates for the processors into uncoupled separated storage units 10A and 10B, provided that the tightly-coupled access rate for main storage is more than the sum of both processor storage request rates. Current main storage technology provides a storage access bandwidth that can obtain a storage access rate more than twice the average access rate of large systems, such as the IBM S/370 M168 uni-processor.

An access conflict exists to the multi-processor main storage only when two or more processors request access simultaneously to storage. This conflict is resolved by the subject invention in a unique way which improves the performance of the entire multi-processing system. The invention does this by making available to an accessing processor every main storage access cycle as long as this processor is presenting requests, and no interference is permitted from any other processor. Another processor is given access for its pending requests to storage whenever an accessing processor is no longer able to continuously present requests on each successive storage cycle. The accessing processor's request buffers are normally empty at the end of its access burst when it loses priority, but the processor and its channels can nevertheless continue operation without loss of efficiency, since these operations will be filling the request buffers in preparation for this processor's next burst. (Prior MP priority controls could switch access priority away from an accessing processor while it still had buffered requests available and required logical storage units (LSUs) available for successive storage cycles, so that the accessing processor could be interrupted before its request buffers were significantly emptied, often resulting in the request buffers quickly becoming full, which prevented the processor from continuing to operate until its request buffer was emptied by after later being given access priority. This conventional interference is reduced by this invention.)

In FIG. 2A the way processor and I/O access requests are supplied and buffered to a local priority circuit 64 is in the prior art, as represented in the IBM S/370 M168 CPU. As in the prior CPU, circuit 64 receives buffered I/O channel access requests through an AND gate 63, receives processor store requests through an AND gate 62 buffered by either of the store address registers (STARS) 57 or 58, and receives processor fetch requests through an AND gate 61 buffered by a fetch address register (FAR) 54. The processor requests are provided through PSCF address latches 52 to buffers FAR 54, STAR 57 or STAR 58. Each request through FAR 54 involves a processor cache miss and is for a block transfer to cache 53 consisting of four double words, in which each double word comprises eight bytes. The cache miss signal is provided by the output of a compare (CMPR) circuit to set a busy trigger 55A, which is reset when the block fetch is completed. The two bit incrementer 55 increments the address in FAR for each next double word request in the block fetch. A request from STAR 57 or 58 is for storing a single double word into main storage. A valid trigger 57A or 58A with each STAR indicates when its contained address is valid. Each channel request is buffered in a channel buffer array 51 capable of buffering up to 24 pending channel access requests. One of the 24 channel requests is out-gated at a time through an array out-register AND gate 63. Each of gates 61, 62, and 63 are gated to local priority circuit 64 only if the LSU required for the request is available, which may be a different LSU for the three requests currently being inputted by the gates for circuit 64. Then, local circuit 64 selects one of these three requests as its output, giving first priority to I/O requests, second priority to STAR requests, and third priority to FAR requests. In this manner, circuit 64 grants local priority, and it can output granted requests at a very rapid rate equal to the main storage cycle rate as long as gate 61, 62 or 63 continuously provide access requests to circuit 64, providing a burst of requests from the output of circuit 64, which are sequentially provided through an OR circuit 72 to granted request output line 75A. That is, it is a characteristic of a single processor not to be able on a long term basis to continuously input requests to circuit 64 at the storage access rate, because after a short period of time either the required LSUs are found unavailable or the request buffers are emptied. The relative rates between the shared main storage and a processor in FIG. 1, as seen from the processor's local priority circuit 64, is that on a long term basis, the processor rate averages to be less than 50% of the main storage access rate. In practice, it is common for such processor rate on a long term basis to not exceed 30% of the storage access rate. As long as the sum of average rates of all processors does not exceed 100% of the main memory access rate, the main memory can access all requests for all processors without significant over-run by any. For equal rate processors in an MP system, the optimum rate ratio per processor is the maximum average processor granted access rate divided by the maximum storage access rate, which ratio should be approximately equal to 1 divided by N, where N is the number of processors in the MP system.

Thus, the subject invention obtains maximum efficiency for MP system performance by permitting each processor to access storage to satisfy all pending requests buffered in its registers 54, 57, 58 and array 51, as long as LSU availability can sustain a continuous granting of those requests from its local priority circuit 64 on its output line 75A. There may be times when a given request is not inputted to circuit 64 because the required LSU in the main storage is busy with some other request, and another input to circuit 64 may then be granted at that time. When no request is inputted to circuit 64 during a processor cycle, the continuous sequence of granted requests on line 75A is broken.

It is the nature of the subject invention that as long as a continuous sequence of granted requests is forthcoming on line 75A that main storage will be operating to satisfy only requests from that processor and will not receive requests from any other processor. However, it is the nature of the multi-processing arrangement, due to the subject invention, that the sustaining of granted requests from one processor cannot continue for long. The ending of the successive cycles of requests from circuit 64 defines the end of a burst of access requests. Then the other processor can access main store and continue to access main store until its burst is ended.

Therefore, this invention gets its efficiency by providing a multi-processor priority circuit that does not cause interruption in the flow of storage accesses by any processor as long as that processor can sustain that flow on every storage cycle. But as soon as a processor cannot sustain the continuous flow, it loses priority to another processor able to sustain a continuous flow of accesses, so that no memory cycles are lost due to the priority circuit switching the shared main storage between different processors in the MP system.

FIG. 2B illustrates in detail the preferred embodiment for MP priority pointer circuits 17A and 17B and their interconnection. Circuits 17A and 17B resolve which of the processors providing simultaneous requests on lines 75A and 75B will be selected for the next storage access to the shared main storage system 10A and 10B.

In priority circuit 17A, granted requests from processor 12A are received on line 75A and set into a latch 76A, which is set for one processor cycle by each granted request from processor 12A. Likewise a corresponding latch 76B in circuit 17B is set for one cycle by each request from processor 12B provided on line 75B.

In priority circuit 17A, three AND gates 81A, 82A, and 83A coordinate for processor 12A the processor granted requests currently being provided from processors 12A and 12B. Priority circuit 17B has corresponding identical AND gates 81B, 82B, and 83B to coordinate priority for processor 12B.

In circuit 17A, request-A and request-B lines are respective outputs of latches 75A and 76A. Inverters 77A and 78A provide complement lines for request-A and request-B respectively. Inputs to AND gate 81A receive the request-A line and the complement request-B line, while inputs to AND gate 82 receive the request-A line and the request-B line. Inputs to AND gate 83A receive the complement request-A line and the complement request-B line. An OR circuit 86A receives the outputs of all of AND gates 81A, 82A and 83A, as well as an output from an OR circuit 84A. OR circuit 84A is activated to force priority for the associated processor if any one of three input lines receive a signal, which are the "not shared main storage" line 84A-1, the "power off for processor B" line 84A-2, and the "MP feature not installed" line 84A-3. Line 84A-1 is activated if the two storage units 10A and 10B are not configured in a configuration register 80A as a shared main storage in a multi-processing system, wherein each processor then operates only with its own storage unit and can not access the other processor storage unit.

Line 84A-2 indicates the condition when power is shut off to the other processor, and hence this processor should obtain continuously enabled priority to the shared main storage. Line 84A-3 indicates that the processor is not part of an MP system, and therefore this processor has sole access to its main storage unit 10A, which can not be accessed by the other unit 10B.

A clock 50 in FIG. 2A is a conventional processor clock which provides trigger and latch clock timing for the signals being passed through the processor circuits, as shown in FIG. 5. Clock 50 outputs trigger clock timing signals C(S) and C(R), which control the timing of the setting and resetting, respectively, of triggers in the processor. The latch clock timing signals C(S) and C(R) similarly control the timing of the settings and resettings, respectively, of latches in the processor. The triggers and latches may use identical bistable circuits and be distinguished by whether they are connected to trigger clock timing lines or to latch clock timing lines.

A trigger 87A in FIG. 2B is set during trigger clock time C(S) by a signal on the output of OR circuit 86A, and a latch 88A is set ½ cycle later during latch clock time C(S) by an output from trigger 87A. The trigger 87A and latch 88A are each reset less than one cycle after each is set by respective reset clock pulses C(R). Therefore, each trigger and each latch is activated only for less than a single clock cycle, staggered by ½ clock cycle.

During the activated output of latch 88A, it provides a signal on an A-priority MP pointer line 20A to the MCU 11A.

The signals from trigger 87A and latch 88A will cause the next main store access to be given to processor 12A. The signal on line 20A activates the MCU to connect the storage address busses and data busses to processor 12A for transfers from the processor to main storage. When trigger 87A is set (½ cycle before latch 88A), it activates the A-MP priority line 87A-1. Line 87A-1 is connected back into PSCF 16A to gate a signal on main storage (MS) select line 15A, for transfers from main storage to processor 12A.

When trigger 87A is set, it also provided an output on a pointer circuit inter-connection line 92 through an inverter 91 to AND gates 82B and 83B in priority pointer circuit 17B to inhibit circuit 17B from granting any priority to the other processor 12B.

Furthermore, the output of latch 88A provides an output which is fed back to its AND circuits 82A and 83A which activates them to pass each next successive local storage request from circuit 16A during the current latch cycle. With this feedback arrangement, each next local request provided from circuit 16A during a trigger cycle will be set into trigger 87A during a latch cycle to cause circuit 17A to continuously provide A-priority pointer signals on line 20A on successive cycles, and the trigger signal on line 92 will be blocking the inputs to trigger 87B to prevent any pointer signal on line 20B.

However, as soon as a clock latch cycle occurs for processor 12A, during which a local request is not forthcoming from circuit 16A, latch 76A will not be set and the not request-A output of inverter 78B is activated in the other MP priority pointer circuit 17B. Also, there will be no signal provided through OR circuit 86A to set trigger 87A and the output 92 of inverter 91 will then enable circuits 82B and 83B in circuits 17B.

With the not request-A signal made active, AND gate 81B is enabled to pass any pending local request which was set into latch 76B for the other processor 12B. The pending request signal will be passed through AND gate 81B to set trigger 87B, and then latch 88B is set ½ cycle later to generate a B-priority MP pointer signal on line 20B. Once MP priority pointer circuit 17B is providing a pointer output, gates 81A, 82A and 83A are blocked in pointer circuit 17A to prevent circuit 17A from interfering with the priority now given to circuit 17B. This blocking of circuits 17A is caused in gate 81A by the deactivation of the not request-B signal, and in gates 82A and 83A by deactivation of the A-priority MP pointer signal existing on line 20A. Circuit 17A will not be able to get priority again until a cycle occurs during which latch 76B is not set to thereby indicate that no request exists from processor 12B. A pending local request set into latch 75A during the blocked condition of circuit 17A will not obtain priority for processor 12A; and processor 12B will continue its priority as long as latch 76A is set on every successive cycle by processor 12B.

It is therefore seen that only one of priority pointer circuits 17A or 17B can activate an output on line 20A or 20B at any one time. Thus, a flip-flop action exists between the outputs of circuits 17A and 17B.

The MP priority pointer signal on line 20A or 20B controls the MP selection of the processor which will next get access to the shared main store. Lines 20A and 20B do this by switching the address and data path in MCU's 11A and 11B. FIGS. 3 and 4 illustrate the details of how the MCU tail switching circuits switch the address and data bus paths under the control of signals on priority pointer lines 20A and 20B. FIG. 3 illustrates the switching for the data path from either processor to the shared main storage. FIG. 4 illustrates the switching of data transfers from the shared main storage to processor A or B.

In FIGS. 3 and 4, each MCU has storage tail switching circuits for each bit position in the address and data busses in both directions between main storage and each processor. Thus, in FIG. 3, storage tail switching circuit 11A-1 comprises AND gates 21 and 22 and a latch 24, which is set by an output from either AND gate 21 or 22. An input to AND gate 21 receives a bit position in the address or data bus provided by processor 12A, while AND gate 22 receives a corresponding bit position from the address or data bus from processor 12B. AND gate 21 has another input connected to A-priority MP pointer line 20A, while AND gate 22 has another input connected to the complementary signal on line 20A provided through inverter 23. The output of latch 24 is provided on bus line 18A-1 to the main storage unit 10A. Thus, whenever either processor 12A or 12B is granted a store or fetch access request to storage unit 10A, the address for that request and the data (if it is a store request) is switched through AND gate 21 or 22, respectively, to an address in storage unit 10A, when it is shared.

The storage tail switching circuit 11B-1 comprises AND gates 26 and 27, inverter 28 and latch 29. The two AND gates 26 and 27 receive a corresponding bit position from the address and data busses from the respective processors 12A and 12B. The B-priority MP pointer line 20B also provides an input to AND gate 27 and a complementary input through inverter 28 to AND gate 26. Circuit 11B-1 operates in the same manner that circuit 11A-1 operates, in order to switch a request from either processor to an address in storage unit 10B, when it is shared.

In FIG. 4, storage tail switching circuits 11A-2 and 11B-2 provide access transfers for any bit position in the data bus from main store to a requesting processor. Responses from main store involve a delay of several processor cycles between the time the request is received by the main storage unit, and the time it responds. A timing delay signal for the storage response is provided from a trigger/latch (T/L) timing chain 30 or 35 for the respective processors.

The pointer lines 20A and 20B indirectly control the transfers through circuits 11A-2 and 11B-2 by means of PSCF controls 16A and 16B in FIG. 2A. For example, in FIG. 2A, a signal on pointer 20A is also presented ½ cycle earlier by a signal on A-MP priority line 87A-1 from trigger 87A to AND gates 66, 67, or 68, one of which is enabled by an outputted local request from circuit 64. The activated AND gate 66, 67, or 68 then will set a corresponding one of latches 71, 73 or 74 to generate the MS select signal on line 15A through OR circuit 72.

In FIG. 4, the processor-A M.S. select line 15A provides the input to timing chain 30, while a corresponding select signal on a line 15B from PSCF controls 16B provides an input to timing chain 35. Thus, a request signalled on pointer 20A is inputted to timing chain 30, and a request signalled on pointer 20B is inputted to timing chain 35 in the other MCU. The M.S. select signal is delayed through the timing chain 30 or 35 until the data response is outputted from storage on the bus 18A-2 or 18B-2, respectively. The output of a responding timing chain is inputted to one of the gates 31 or 32 in circuit 11A-2, or one of gates 36 or 37 in circuit 11B-2 in accordance with which of the two processors is making the request, and which of the storage units is providing the access. The latches 34 and 39 operate to pass the access/response back to the requesting processor.

It is noted that circuits 17A and 17B are still operational if the request input from the other processor is not connected to AND circuit 82. That is, the request-B input may be removed from gate 82A, and the request-A input may be removed from gate 82B. Either gate 82A or 82B will still maintain the set condition for its trigger 87 and latch 88 as long as local requests from its respective processor are received on successive clock cycles.

FIG. 5 illustrates timing examples local to either processor when it is given MP priority. The trigger clock time and latch clock time are phased ½ cycle apart.

It is therefore apparent that the described preferred embodiment operates for a multiprocessor having two processors. However, the subject invention is equally applicable to a multiprocessor system having any number of processors. It will become evident upon studying the subject embodiment that N number of processors can be supported by correspondingly increasing the number of AND gates in each set 81-83 in each circuit 17 to accommodate the true and complement signal combinations from all of the request latches 76. Likewise, each MCU storage tail switching circuit in FIGS. 3 and 4 will have an additional AND gate for each additional processor provided in the multi-processor configuration.

Although the invention has been shown and described with respect to a preferred embodiment thereof, it should be understood by those skilled in the art that various changes and omissions in the form and details of the invention may be made therein without departing from the spirit and the scope of the invention, which is to be limited only as set forth in the following claims.

What is claimed is:

1. A floating priority storage control arrangement for a processor for use when the processor is connected in a multi-processor system for coordinating priority of the processor to a shared main storage entity in relation to each other processor in the multi-processing system, the arrangement comprising: plural register means within each processor for storing storage access requests, a local priority circuit for resolving priority within the processor among storage access requests in the plural register means, the local priority circuit outputting locally granted storage access requests, transfer means including address and data buses for controlling data transfers between the processor and main storage in either direction for an accessed storage request, and a multi-processing priority pointer circuit with each processor in the system for controlling the order of accesses by the processors to a shared main storage, the priority pointer circuit comprising:

local latch means in each processor connected to the output of the local priority circuit to receive each locally granted storage access request for the processor, true and complement request lines being provided from the local latch means;

a set having a corresponding true request line and a corresponding complement request line provided from an output of a corresponding latch means in each other processor when the processors are connected in a multi-processing system.

a first AND circuit having inputs connected to the true line from the local latch means and to the corresponding complement request line, a second AND circuit having inputs connected to the true line from each local latch means, a third AND circuit having inputs connected to the complement request line from each local latch means and to the corresponding complement request signal means, a first bistable means having set and reset inputs, combining means connecting the outputs of the first, second and third AND circuits to the set input of the first bistable means, a second bistable means connected to the output of the first bistable means to provide a multi-processor pointer signal for the processor, the pointer signal being connectable to a shared main storage in a multi-processor system, the second bistable means being set from the first bistable means later within a processor clock cycle of the setting of the first bistable means, and an inter-processor control input line being connected to input lines of the second and third AND circuits, the inter-processor control input line being connectable to an MP priority signal line either directly from the first bistable means or inverted from a corresponding first bistable means in another processor, whereby the floating priority storage control arrangement enables a burst transfer of data on the transfer means of the processor for accessing a shared main memory of a multi-processing system when the processor is connected in a multi-processing system.

2. A floating-priority storage control arrangement for the processor connectable in a multiprocessor system as defined in claim 1, in which a first OR circuit provides the combining means which has inputs connected to the outputs of the first, second and third AND circuits, the OR circuit having an output connected to the set input of the first bistable circuit, a second OR circuit having an output connected to another input of the first OR circuit, inputs to the second OR circuit being connected to status lines providing signals for continuously enabling the pointer signal for the processor, the status lines including a non-shared main storage line, a power off on each other processor line, and a not installed multiprocessor line.

3. A floating-priority storage control arrangement in each processor in a multiprocessing (MP) system, as defined in claim 2, there being at least two processors in the MP system, the first processor comprising:

means connecting the output of the second bistable means in the first processor to the inter-processor control input.

4. A multiprocessor system as defined in claim 3, further including:

means also connecting an inverted output of the first bistable means of the first processor to the inter-processor control input of the second processor.

5. A floating priority storage control arrangement for each processor connected to a multi-processor (MP) system for coordinating priority among the processors to a shared main storage entity, the arrangement comprising: plural register means in each processor for storing access requests within the processor, a local priority circuit for resolving priority within each processor among storage access requests pending in the plural register means, the local priority circuit in each processor outputting locally granted storage access requests one at a time, transfer means including address and data buses for controlling data transfers between the processor and main storage in either direction for an accessed storage request, a multi-processing priority pointer circuit associated with each processor in the MP for controlling the sequence of accesses by the processors to the shared main storage in each processor, the MP priority pointer circuit comprising:

means for receiving locally granted storage access requests and outputting true and complement local request signals for the associated processor, first gate means for receiving the true local request signal from the associated processor and the complement local request signal from each other processor, second gate means for receiving the true local request signals from the associated processor, third gate means for receiving the complement local request signals from the associated processor and from each other processor in the MP system, first bistable means having a set input receiving combined outputs of the first, second and third gate means, second bistable means having a set input receiving the output of the first bistable means and being set by a delayed clock pulse when the first bistable means is set, the output of the second bistable means providing the priority MP pointer output for the associated processor, a feedback input to each of the second and third gate means of the first processor, the feedback input being connected to the priority MP pointer output of the first processor, an inter-processor input to each of the second and third gate means of the second processor, the inter-processor input being connected to an inverted output from the first bistable means of the first processor.

6. A floating priority storage control arrangement for each processor in a MP system as defined in claim 5, each processor further comprising:

the local priority circuit in each processor having a plurality of outputs, each output for signalling a different type of locally granted access request, only one output of the local priority circuit providing a locally granted access request at any one time, a plurality of local priority gates each receiving a different output from the local priority circuit, a feedback input to each of the local priority gates connected to an output of the first bistable means in the MP priority pointer circuit for the same processor, a plurality of latches having set inputs respectively connected to outputs of the local priority gates, an OR circuit having inputs provided from outputs of the plurality of latches, an output of the OR circuit providing a main storage selected signal for accesses from the shared main storage, and a multi-system communication unit receiving the select line to switch bus lines between a selected main storage unit and a requesting processor.

* * * * *